A. ELMENDORF.
GLUING MACHINE.
APPLICATION FILED JULY 19, 1920.
1,400,943.
Patented Dec. 20, 1921.
2 SHEETS—SHEET 1.
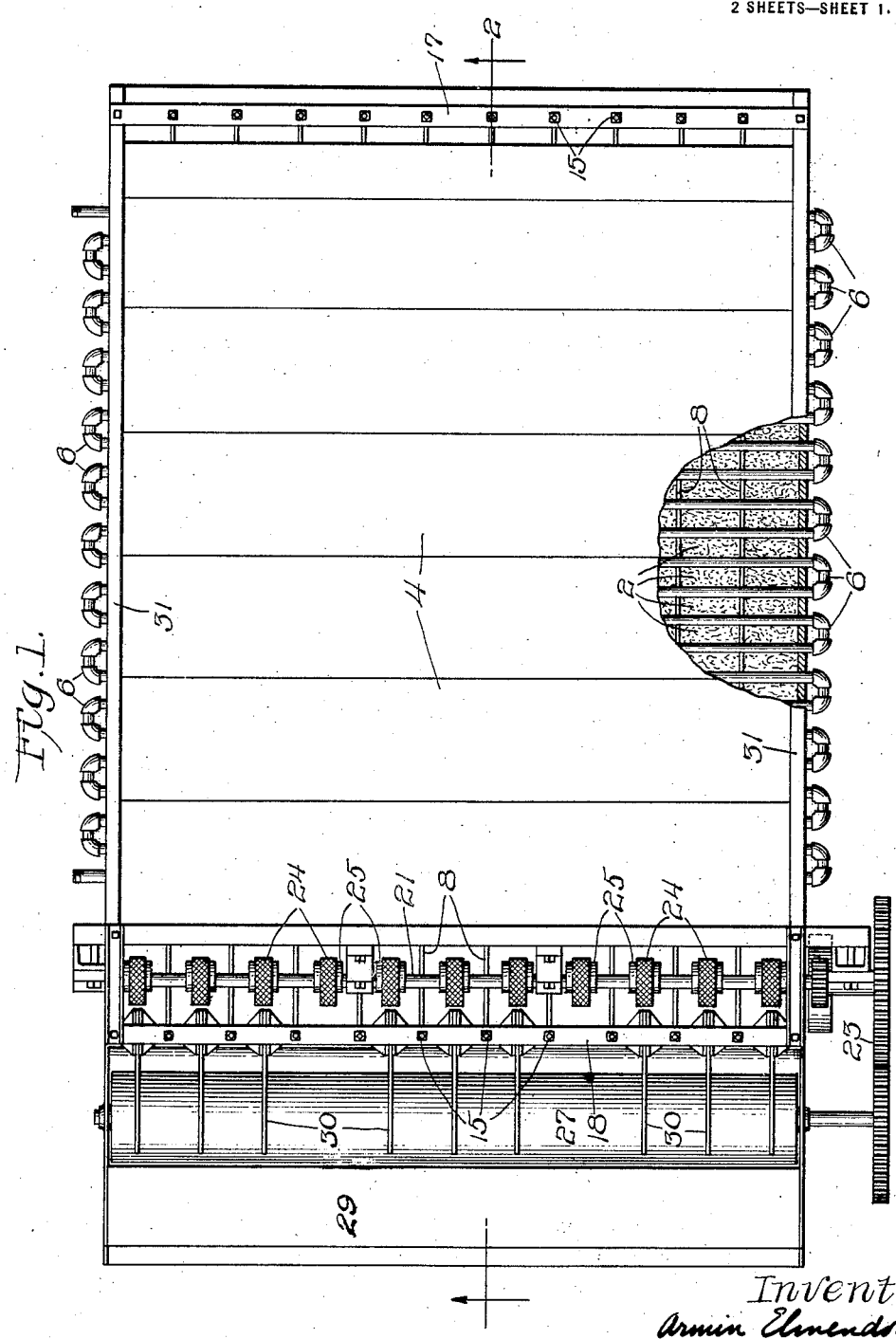
Inventor:
Armin Elmendorf
by Chamberlin Freudenreich
Attys A. ELMENDORF.
GLUING MACHINE.
APPLICATION FILED JULY 19, 1920.
1,400,943.
Patented Dec. 20, 1921.
2 SHEETS—SHEET 2.
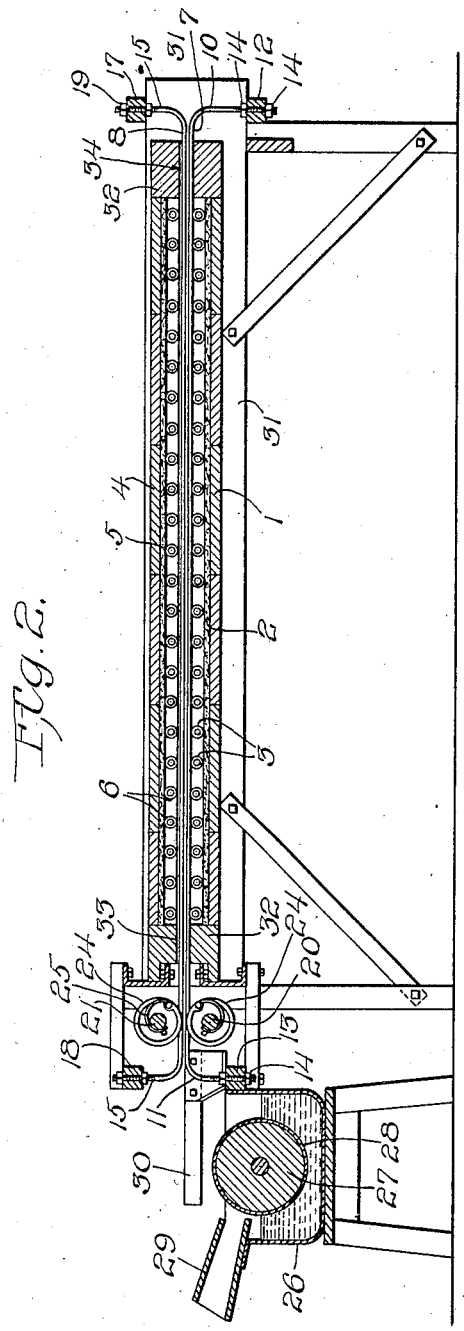
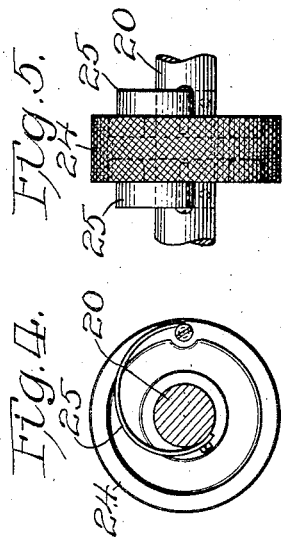
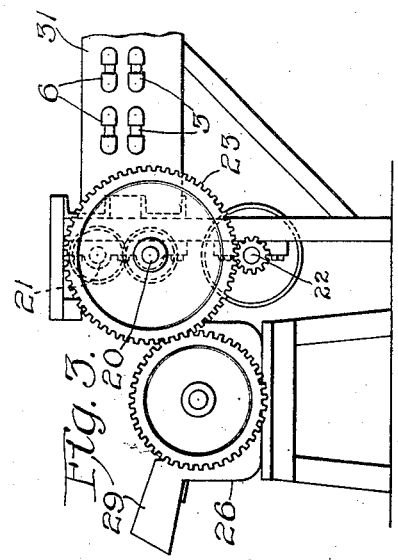
Inventor:
Armin Elmendorf,
by Chamberlin & Freudenreich
Attys.

UNITED STATES PATENT OFFICE.

ARMIN ELMENDORF, OF MADISON, WISCONSIN, ASSIGNOR TO HASKELITE MANUFACTURING CORPORATION, A CORPORATION OF NEW YORK.

GLUING-MACHINE.

1,400,943.　　　　Specification of Letters Patent.　　Patented Dec. 20, 1921.

Application filed July 19, 1920. Serial No. 397,350.

*To all whom it may concern:*

Be it known that I, ARMIN ELMENDORF, a citizen of the United States, residing at Madison, county of Dane, State of Wisconsin, have invented a certain new and useful Improvement in Gluing-Machines, and declare the following to be a full, clear, and exact description of the same, such as will enable others skilled in the art to which it pertains to make and use the same, reference being had to the accompanying drawings, which form a part of this specification.

My invention has for its object to produce a simple and efficient machine for gluing strips edge to edge to form sheets of any desired length.

In gluing thin strips, such as wood veneer, edge to edge, it is necessary that the edges to be joined be brought into registration with each other, that they be pressed against each other throughout the length of the joint and, where a blood albumen glue is employed, that heat be applied so as to cause the glue to set under heat and pressure. It takes an appreciable time for the glue to set and therefore, in order to make a continuous process, it is necessary to provide clamping or holding members of considerable area in order that a moving joint may remain within the same long enough to become set. A fault often found in machines of this character is that the clamping means, because of the large work surface with which it engages, produces too much frictional resistance to the advance of the work, particularly where the latter is thin wood veneer. One of the objects of the present invention is to produce a simple and novel machine having clamping elements of large area in which just the right amount of friction may be secured to give the best results and, where heat is required to set the glue, efficiently apply the heat to the work.

In carrying out my invention the work is fed in a direction at right angles to the joints. It sometimes happens that a strip will not be accurately placed in the feed rolls and therefore it will touch the strip in advance at one end while there is still a gap in the joint at the other end. It also sometimes happens that the edges of the strips are not quite straight so that gaps will be left in the joint when two strips are simply placed edge to edge. A further object of the present invention is to produce a type of feed roll which will permit each strip automatically to adjust itself so as to bring its edge, if straight, in contact with the strip in advance thereof; and, in case of unevenness in the edge of a strip, to permit the portions of the strip in the vicinity of gaps in the joint to be forced ahead far enough, within limits, to close the gaps.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a machine arranged in accordance with my invention, a section of the top being broken away to expose underlying parts;

Fig. 2 is a vertical longitudinal section taken approximately on line 2—2 of Fig. 1;

Fig. 3 is a side elevation of the front end of the machine, showing only those parts which have to do with the driving of the feed rolls;

Fig. 4 is a transverse section on an enlarged scale through one of the feed rolls, illustrating the means for attaching an individual section thereto; and Fig. 5 is an edge view of the feed roll section shown in Fig. 4, and an elevation of a part of the shaft on which it is mounted.

Referring to the drawings, 1 represents a long broad bed which may conveniently be made of wood, the bed having a width at least as great as the length of the strips to be glued together and a length sufficient to allow time for a joint between two strips to set while the joint is traveling across the length of the bed. The bed is preferably covered with a layer, 2, of insulating material which may conveniently be asbestos. Above the insulating layer is placed a layer of steam pipes, 3. Above the parts just described is a similar set of parts reversely arranged, however. Thus there is a bed or cover, 4, corresponding to the member 1; beneath this is an insulating layer, 5; and beneath the insulating layer is a layer of steam pipes, 6. The members 1, 2 and 3 constitute what may be termed a base and the members 4, 5 and 6 constitute what may be termed a cover, both the base and the cover being stationary. The two layers of pipes are spaced apart from each other in the vertical direction. Between the two layers of pipes extend two sets of rods, 7 and 8; the pipes preferably extending transversely of the machine while the rods extend in the longitudinal direction. The rods of each set are spaced apart so as to form in effect two superposed grids. The distance between the steam pipes is greater than the combined thicknesses of the two grids so that strips to be glued may be fed between the grids at the front end of the machine and, after passing lengthwise through the machine be discharged from between the grids at the rear end. The lower set of rods or grid constitutes a series of tracks or rails on which the work slides with less resistance than though the work rested on a continuous surface. The upper set of rods or grid is adapted to rest upon the work, being of sufficient weight to flatten out the strips if the latter are warped or wavy, but not imposing too much frictional resistance to the advancing movement of the strips. Some means must be provided for holding the rods in place. In the arrangement shown, each of the lower set of rods has its ends bent downwardly as indicated at 10 and 11; these downward extensions passing through stationary supporting bars, 12 and 13, respectively. Nuts, 14, on the rods on opposite sides of the bars 12 and 13 serve to hold the rods against displacement. The ends of each of the upper set of rods are bent upwardly as indicated at 15 and 16, these upward extensions passing through holes in suitable stationary supporting bearings, 17 and 18, and having holding nuts, 19, similar to the nuts 14. The vertical extensions of the rods are screw threaded for a sufficient distance to permit them to be adjusted up and down so as to vary the distance between the horizontal portions of the rods. Since the rods are long, they are comparatively flexible and the middle portions will sag down and engage with the top of the work without making it necessary to adjust the supported ends of the rods to the work with extreme accuracy.

At the front end of the machine are feed rolls between which the strips to be glued together are fed one at a time and pushed through the machine. In the arrangement shown, the feed rolls consist of two parallel horizontal shafts, 20 and 21, adapted to be driven slowly from a suitable power shaft, 22, through suitable gearing, 23; each shaft having thereon a series of short cylinder sections, 24. The members 24 are loose on the supporting shafts but are connected thereto by means of suitable springs, 25, which tend to hold them in predetermined angular relation thereon, but permit them to turn independently of each other through a considerable angle. The springs are preferably spirals as shown, one being placed on each side of each of the roll sections. The result of this construction is that if the edge of a strip which is in the rolls does not lie quite parallel with the strip preceding it and to which it is to be joined, there will be a flexing or twisting of the cylindrical surfaces of the rolls to permit the lagging end of the strip to be fed ahead after contact has been made between the opposite end of the strip and the strip preceding it. Furthermore, in case the edge of a strip should not be quite straight as, for example, if it should be slightly concave so that the ends will come in contact with the preceding strip while there is still a gap at the middle, those sections of the rolls in engagement with the portion of the strip in the vicinity of the gap will continue to force the strip into the machine while other sections are standing still or turning more slowly, with the result that the gap or gaps will be closed. Since the roll sections are spaced apart from each other, the front ends of the rods or grids may be carried forward between the roll shafts so as to form guides for directing the work to the rolls.

In advance of the front ends of the rods or grids and the feed rolls and below the same, is placed a long glue reservoir, 26, in which is disposed a horizontal roller, 27, the surface of which is preferably covered with a material such as fiber matting, 28, which will avoid the depositing of an excess of glue on the edge of a strip held against the roll, as might be the case if the roll had a smooth cylindrical surface. Further assistance is given in the prevention of the depositing of an excess amount of glue by causing the glue roll to turn very slowly, at a speed only sufficient to insure a wet coating of glue along the line at which contact with the work is to be made. A funnel or bell-shaped member, 29, may be mounted on the reservoir in front of the glue roll so that the operator of the machine, by inserting a strip into this device and pushing it toward the roll will be sure to have the strip positioned at the proper angle to receive the glue from the roll.

After a strip has had glue applied to one edge, it is reversed and glue applied to the other edge, if both edges of each strip are to be coated, and the strip is then laid upon a supporting platform, which may consist of a series of parallel flat bars, 30, set on edge in advance of the front ends of the grids and having their upper edges in about the same plane as that of the tops of the rods in the lower grid, and then, by pushing the strip along the platform, is entered between the bars and guided thereby between the feed rolls.

The feed rolls push the strips into the machine, forcing the preceding strips onward by pushing the strips still in the rolls against them, until finally the first strip to have been fed into the machine emerges at the rear end. In passing through the machine the strips are flattened out, their edges are pressed firmly together, and the glue is heated by the steam pipes through radiation and convection, the rods having very little effect so far as the application of heat is concerned. It will be seen that sheets of any desired length may be made. If desired, by employing a suitable clipping device, not shown, at the rear end of the machine, the sheet may be cut into panels of any required length as it is formed. Furthermore, continuity of operation does not require continuity of product because after enough strips have been fed into the machine to produce a panel or sheet of the desired length, glue may be left out of the next joint so that, while the process of feeding the work through the machine is the same as though all the joints were glued, the sheet will separate into two parts at the unglued joints when the latter passes from the machine.

Coöperating with the base and cover of the machine are side members, 31, and end members, 32, which transform the whole into a closed casing; the casing having a long narrow slot, 33, in the front end and a similar slot, 34, in the opposite end through which the rods project.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A machine of the character described comprising two work-engaging members arranged one above the other and having a width as great as the length of strips to be glued edge to edge, and feed rolls arranged at one end of said members to feed strips between the latter, said rolls each containing a plurality of sections yieldingly held to permit independent relative angular movements about the axis of the roll and at the same time be prevented from moving bodily transverse to said axis.

2. A feed roll comprising a shaft, a series of short cylinders distributed along the shaft and loose on the same, so as to be rotatable thereon and held against bodily movements transversely of the shaft, and springs connecting said cylinders to the shaft so as to yieldingly hold them in predetermined angular relations and permit them to move independently of each other through limited angles.

3. A machine of the character described comprising two sets of long parallel rods arranged in two horizontal planes spaced apart from each other, the upper rods being supported at their ends so as to leave the middle portions free to move up and down, and means for feeding strips to be glued edge to edge between two sets of rods with the joints extending transversely of the rods.

4. A machine of the character described comprising two sets of parallel rods arranged in horizontal planes spaced apart from each other, and means for feeding strips to be glued together edge to edge between said sets of rods with the joints extending transversely of the rods.

5. A machine of the character described comprising two sets of parallel rods arranged in horizontal planes spaced apart from each other, means for feeding strips to be glued together edge to edge between said sets of rods with the joints extending transversely of the rods, heating means arranged above and below the two sets of rods in position to subject strips passing between the rods to heat by direct radiation.

6. A machine of the character described comprising two sets of parallel rods arranged in horizontal planes spaced apart from each other, means for feeding strips to be glued together edge to edge between said sets of rods with the joints extending transversely of the rods, an insulated casing surrounding the two sets of rods, and heating means in said casing above and below the rods constructed and arranged to subject strips passing between the rods to heat by direct radiation and by convection.

7. A machine of the character described comprising a long flat shallow casing having an opening extending across the front and rear ends thereof, two sets of parallel rods arranged within the casing one above the other and extending throughout the length of the latter, feed rolls arranged at the front end of the casing, said feed rolls being reduced in diameter at intervals throughout their length to form peripheral channels, and the front ends of said rods being projected forwardly through said channels.

8. A machine of the character described comprising a long flat shallow casing having an opening extending across the front and rear ends thereof, two sets of parallel rods arranged within the casing one above the other and extending throughout the length of the latter, feed rolls arranged at the front end of the casing, said feed rolls being reduced in diameter at intervals throughout their length to form peripheral channels, and the front ends of said rods being projected forwardly through said channels, the front ends of the upper rods being bent upwardly in front of the feed rolls and the front ends of the lower rods being bent downwardly in front of the feed rolls to form a flaring inlet for strips to be fed into the rolls.

In testimony whereof, I sign this specification.

ARMIN ELMENDORF.